United States Patent
Hayashi

(10) Patent No.: US 11,386,612 B2
(45) Date of Patent: Jul. 12, 2022

(54) NON-TRANSITORY COMPUTER-READABLE MEDIUM, IMAGE PROCESSING METHOD, AND IMAGE PROCESSING SYSTEM FOR CONTROLLING PROGRESS OF INFORMATION PROCESSING IN RESPONSE TO A USER OPERATION

(71) Applicant: SQUARE ENIX CO., LTD., Tokyo (JP)

(72) Inventor: Masato Hayashi, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 16/917,728

(22) Filed: Jun. 30, 2020

(65) Prior Publication Data
US 2021/0005014 A1 Jan. 7, 2021

(30) Foreign Application Priority Data
Jul. 5, 2019 (JP) .............................. JP2019-125973

(51) Int. Cl.
*G06T 15/20* (2011.01)
*G06T 7/00* (2017.01)
*G06T 19/20* (2011.01)

(52) U.S. Cl.
CPC .............. *G06T 15/205* (2013.01); *G06T 7/97* (2017.01); *G06T 19/20* (2013.01)

(58) Field of Classification Search
None
See application file for complete search history.

(56) References Cited

U.S. PATENT DOCUMENTS

| 9,261,954 | B2 | 2/2016 | Tsurumi |
| 9,886,798 | B2 | 2/2018 | Tsurumi |
| 10,171,738 | B1 * | 1/2019 | Liang ................. H04N 5/23254 |

(Continued)

FOREIGN PATENT DOCUMENTS

| JP | 2014191718 A | 10/2014 |
| JP | 2017062559 A | 3/2017 |

OTHER PUBLICATIONS

Amazon also started [AR View]! More stable and easier to use than other companies, [online] May 19, 2019) https://new.shuno-oshieru.com/amazon_ar.

(Continued)

*Primary Examiner* — Jeffrey J Chow
(74) *Attorney, Agent, or Firm* — Dorsey & Whitney LLP

(57) ABSTRACT

A non-transitory computer-readable medium including a program is provided. The program causes a computer connected to an image capturing apparatus to: specify a virtual space; generate a virtual space image obtained by photographing the virtual space including at least one virtual object; output a synthetic image of the captured image and the virtual space image to a display device with a touch panel; determine a content of a user operation against the touch panel; update a position or a posture of each of the virtual camera and the virtual object when the user operation is a first operation in which a touch position against the touch panel does not move after the touch panel is touched; and rotate the virtual object in a predetermined direction when the user operation is a second operation in which the touch position is slid on the touch panel.

10 Claims, 11 Drawing Sheets

(56) References Cited

U.S. PATENT DOCUMENTS

| | | | |
|---|---|---|---|
| 2011/0012848 A1* | 1/2011 | Li | G06F 3/04166 |
| | | | 345/173 |
| 2014/0292645 A1 | 10/2014 | Tsurumi | |
| 2016/0163117 A1 | 6/2016 | Tsurumi | |
| 2017/0090716 A1 | 3/2017 | Inomata et al. | |
| 2017/0256099 A1* | 9/2017 | Li | G06F 3/04842 |
| 2018/0122149 A1 | 5/2018 | Tsurumi | |
| 2018/0210628 A1* | 7/2018 | McPhee | G06T 19/006 |
| 2020/0043243 A1* | 2/2020 | Bhushan | G06F 3/04883 |

OTHER PUBLICATIONS

English translation of Japanese Office Action for JP Application No. 2019-125973 dated Oct. 13, 2020.
Tamebay TV, Amazon Augmented Reality—YouTube, [online], Nov. 7, 2018, [TIME] 0:32-0:39 [searched on Sep. 28, 2020] https://www.youtube.com/watch?v=nyqN3yGFBVM.

* cited by examiner

OPERATION RELATED INFORMATION

| OPERATIONAL TARGET | COORDINATE | POSTURE | AXIS OF ROTATION | ... |
|---|---|---|---|---|
| OPERATIONAL OBJECT 1 | (x, y, z) | (ax, ay, az) | x:1<br>y:0<br>z:0 | ... |

# NON-TRANSITORY COMPUTER-READABLE MEDIUM, IMAGE PROCESSING METHOD, AND IMAGE PROCESSING SYSTEM FOR CONTROLLING PROGRESS OF INFORMATION PROCESSING IN RESPONSE TO A USER OPERATION

CROSS-REFERENCE TO RELATED APPLICATION

The present application claims priority to Japanese Patent Application No. 2019-125973 filed on Jul. 5, 2019, the disclosure of which is expressly incorporated herein by reference in its entirety.

BACKGROUND OF THE INVENTION

Field of the Invention

At least one of embodiments of the present invention relates to a non-transitory computer-readable medium including an information processing program, an information processing method, and an image processing system for sharing virtual processing against an actual object fixedly arranged in a real world with a plurality of users by means of an augmented reality technique.

Description of the Related Art

In recent years, an augmented reality (AR: Augmented Reality) technique has started to be provided. The augmented reality technique is a technique in which a virtual object is displayed in a real space by superimposing and displaying a flat or three-dimensional object (hereinafter, referred to as an "AR object") onto an image in the real space.

Further, a technique to cause a user to operate an object displayed by the augmented reality technique has been proposed. As such a technique, for example, there is one in which an object is caused to move in an augmented reality space in a case where a user operation is a first operation (see JP2014-191718A; hereinafter, referred to as "Patent Document 1").

SUMMARY OF THE INVENTION

However, in the conventional technique, there has been a case where a user cannot intuitively operate an AR object.

It is an object of at least one of embodiments of the present invention to solve the problem described above, and improve operability of an AR object.

According to one non-limiting aspect of the present invention, there is provided a non-transitory computer-readable medium including a program for causing a computer to perform functions, the computer being connected to an image capturing apparatus.

The functions include a specifying function configured to specify a virtual space corresponding to a captured image, the captured image being taken by the image capturing apparatus.

The functions also include a generating function configured to generate a virtual space image, the virtual space image being obtained by photographing the virtual space including at least one virtual object by means of a virtual camera corresponding to the image capturing apparatus.

The functions also include an outputting function configured to output a synthetic image to a display device, the synthetic image being obtained by synthesizing the captured image and the virtual space image, the display device including a touch panel.

The functions also include a determining function configured to determine a content of a user operation against the touch panel.

The functions also include an updating function configured to update, in a case where it is determined that the user operation is a first operation, a position or a posture of each of the virtual camera and the virtual object in a state where a relationship between the virtual camera and the virtual object is fixed in accordance with movement or a change in a posture of the image capturing apparatus while the first operation is continuing, the first operation being an operation in which a touch position against the touch panel does not move after the touch panel is touched.

The functions also include a rotating function configured to rotate the virtual object in a predetermined direction in a case where it is determined that the user operation is a second operation, the second operation being an operation in which the touch position is slid on the touch panel, the predetermined direction being defined by the second operation.

According to another non-limiting aspect of the present invention, there is provided an image processing method of controlling progress of information processing in response to a user operation.

The image processing method includes a specifying process of specifying a virtual space corresponding to a captured image, the captured image being taken by an image capturing apparatus connected to a computer.

The image processing method also includes a generating process of generating a virtual space image, the virtual space image being obtained by photographing the virtual space including at least one virtual object by means of a virtual camera corresponding to the image capturing apparatus.

The image processing method also includes an outputting process of outputting a synthetic image to a display device, the synthetic image being obtained by synthesizing the captured image and the virtual space image, the display device including a touch panel.

The image processing method also includes a determining process of determining a content of a user operation against the touch panel.

The image processing method also includes an updating process of updating, in a case where it is determined that the user operation is a first operation, a position or a posture of each of the virtual camera and the virtual object in a state where a relationship between the virtual camera and the virtual object is fixed in accordance with movement or a change in a posture of the image capturing apparatus while the first operation is continuing, the first operation being an operation in which a touch position against the touch panel does not move after the touch panel is touched.

The image processing method also includes a rotating process of rotating the virtual object in a predetermined direction in a case where it is determined that the user operation is a second operation, the second operation being an operation in which the touch position is slid on the touch panel, the predetermined direction being defined by the second operation.

According to still another non-limiting aspect of the present invention, there is provided an image processing system for controlling progress of information processing in response to a user operation. The image processing system includes a communication network, a server, and a user terminal to which an image capturing apparatus is connected.

The image processing system includes a specifying unit configured to specify a virtual space corresponding to a captured image, the captured image being taken by the image capturing apparatus.

The image processing system also includes a generating unit configured to generate a virtual space image, the virtual space image being obtained by photographing the virtual space including at least one virtual object by means of a virtual camera corresponding to the image capturing apparatus.

The image processing system also includes an outputting unit configured to output a synthetic image to a display device, the synthetic image being obtained by synthesizing the captured image and the virtual space image, the display device including a touch panel.

The image processing system also includes a determining unit configured to determine a content of a user operation against the touch panel.

The image processing system also includes an updating unit configured to update, in a case where it is determined that the user operation is a first operation, a position or a posture of each of the virtual camera and the virtual object in a state where a relationship between the virtual camera and the virtual object is fixed in accordance with movement or a change in a posture of the image capturing apparatus while the first operation is continuing, the first operation being an operation in which a touch position against the touch panel does not move after the touch panel is touched.

The image processing system also includes a rotating unit configured to rotate the virtual object in a predetermined direction in a case where it is determined that the user operation is a second operation, the second operation being an operation in which the touch position is slid on the touch panel, the predetermined direction being defined by the second operation.

According to each of the embodiments of the present application, one or two or more shortages are solved.

BRIEF DESCRIPTION OF DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. Note that various components in the respective embodiments described below can be appropriately combined without any contradiction or the like. In addition, the description of the content described as a certain embodiment may be omitted in another embodiment. Further, the content of an operation or processing that does not relate to features of each of the embodiments may be omitted. Moreover, the order of various processes that constitute various flows described below may be changed without any contradiction or the like of processing content.

Figure 1:
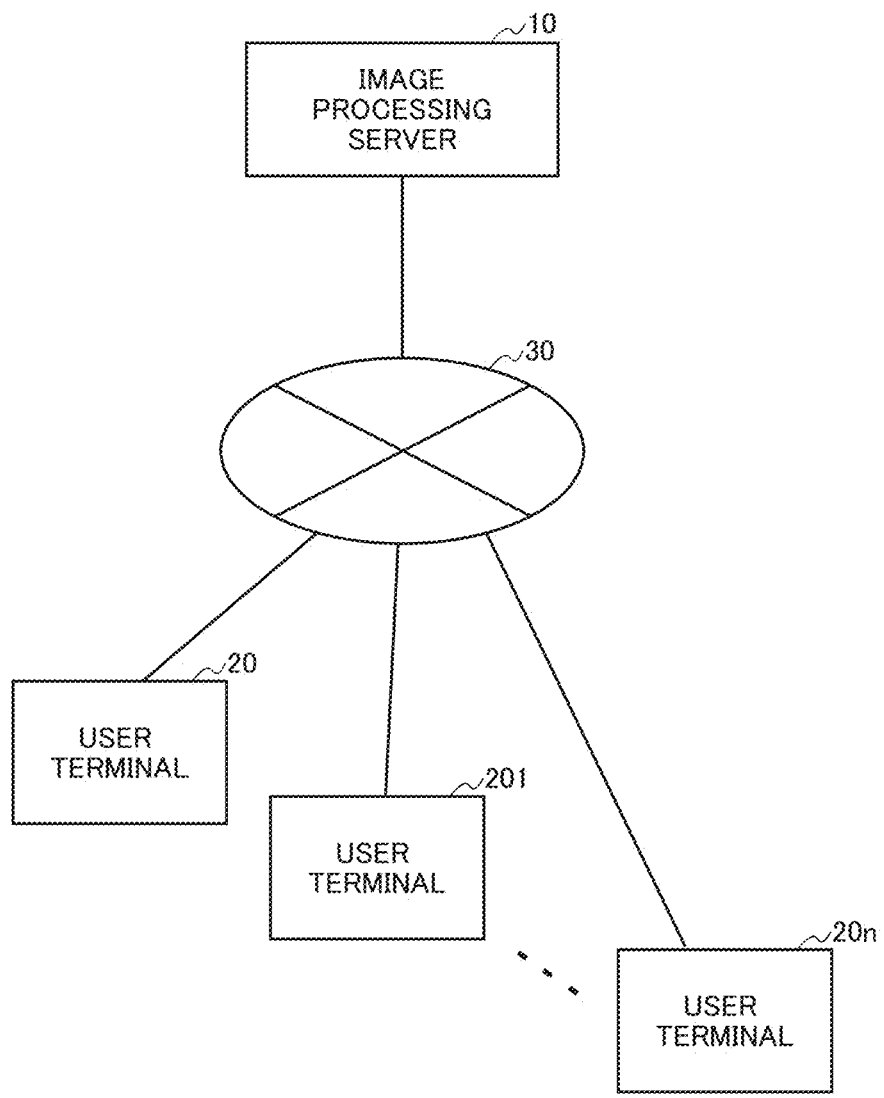
FIG. 1 is a block diagram illustrating an example of a configuration of image processing system corresponding to at least one of the embodiments of the present invention.

FIG. 1 is a block diagram illustrating an example of a configuration of an image processing system 100 according to one embodiment of the present invention. As illustrated in FIG. 1, the image processing system 100 includes an image processing server 10 and user terminals 20 to 20n (" " is an arbitrary integer) respectively used by users of the image processing system 100. In this regard, the configuration of the configuration of the image processing system 100 is not limited to this configuration. The image processing system 100 may be configured so that a plurality of users uses a single user terminal, or may be configured so as to include a plurality of image processing servers.

Each of the image processing server 10 and the plurality of user terminals 20, 201 to 20n is connected to a communication network 30 such as the Internet. In this regard, although it is not illustrated in the drawings, the plurality of user terminals 20, 201 to 20n is connected to the communication network 30 by executing data communication with base stations managed by a telecommunication carrier by means of a radio communication line, for example.

The image processing system 100 includes the image processing server 10 and the plurality of user terminals 20, 201 to 20n, thereby realizing various kinds of functions for executing various kinds of processes in response to an operation of the user.

The image processing server 10 is managed by an administrator of the image processing system 100, and has various kinds of functions to provide information regarding the various kinds of processes to each of the plurality of user terminals 20, 201 to 20n. In the present embodiment, the image processing server 10 is constructed by an information processing apparatus, such as a WWW server, and includes a storage medium for storing various kinds of information. In this regard, the image processing server 10 is provided with a general configuration to execute various kinds of processes, such as a control unit or a communicating unit, as a computer. However, its explanation herein is omitted. Further, in the image processing system 100, it is preferable that the image processing server 10 manages various kinds of information from a point of view to reduce a processing load on each of the plurality of user terminals 20, 201 to 20n. However, a storage unit configured to store various kinds of information may be provided with a storage region in a state that the image processing server 10 can access the storage region. For example, the image processing server 10 may be configured so as to include a dedicated storage region outside the image processing server 10.

Each of the plurality of user terminals 20, 201 to 20n is managed by a user, and has various kinds of functions to execute various kinds of processes by using information received from the image processing server 10. In the present embodiment, each of the plurality of user terminals 20,201 to 20n may be a communication terminal such as a cellular telephone terminal or a PDA (Personal Digital Assistants), for example. A camera device for photographing at least one of a moving image or a still image by the user is mounted in each of the plurality of user terminals 20, 201 to 20n, and each of the plurality of user terminals 20, 201 to 20n includes a display for displaying photographed image data or the like. Further, the camera device may include an optical camera, or may be one that uses a three-dimensional camera device together. Further, each of the plurality of user terminals 20, 201 to 20n includes inputting means for inputting drawing information, such as a mouse, a touch panel, or a touch pen. In this regard, as other examples of the configuration of the user terminal that can be included in the image processing system 100, there are a so-called wearable divide such as a smartwatch, and a combination of the wearable divide and the communication terminal.

Further, each of the plurality of user terminals 20, 201 to 20n is connected to the communication network 30, and includes hardware and software for executing various kinds of processes by communicating with the image processing server 10. In this regard, each of the plurality of user terminals 20, 201 to 20n may be configured so as to be capable of directly communicating with each other without using the image processing server 10.

In process of executing information processing, the image processing server 10 appropriately transmits a process stage to each of the plurality of user terminals 20, 201 to 20n. Each of the plurality of user terminals 20, 201 to 20n causes a display device to display the screen content based on the content of the received process stage on a display screen of the display device. The image processing server 10 may generate the screen content, or each of the plurality of user terminals 20, 201 to 20n may generate the screen content.

Figure 2:
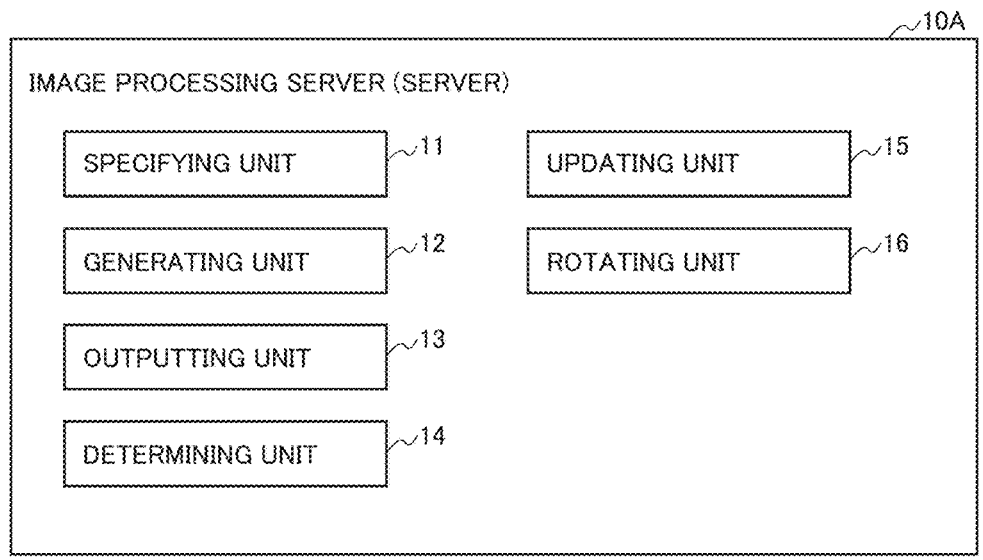
FIG. 2 is a block diagram illustrating a configuration of a server corresponding to at least one of the embodiments of the present invention.

FIG. 2 is a block diagram illustrating an image processing server 10A (hereinafter, referred to as a "server 10A"), which is an example of the configuration of the image processing server 10. As illustrated in FIG. 2, the server 10A at least includes a specifying unit 11, a generating unit 12, an outputting unit 13, a determining unit 14, an updating unit 15, and a rotating unit 16.

The specifying unit 11 has a function to specify a virtual space corresponding to a captured image taken by an image capturing apparatus.

Here, as an example of the image capturing apparatus, there is a camera connected to the user terminal 20 that can communicate with the server 10A. Further, the virtual space corresponding to the captured image means a virtual space for photographing an AR object to be superimposed and displayed on the captured image. Since a configuration to specify the virtual space is performed by using a known technique, its detailed explanation will be omitted. However, it is preferable that a real space specified from the captured image is associated with the specified virtual space by a predetermined rule. As an example of such a configuration, there is a configuration in which a virtual space including a virtual object whose arrangement is determined on the basis of a position and a direction of the image capturing apparatus is specified.

The generating unit 12 has a function to generate a virtual space image obtained by photographing a virtual space by means of a virtual camera corresponding to the image capturing apparatus. The virtual space includes at least one virtual object.

Here, the virtual object means an object that is arranged in a virtual space. A configuration of the virtual object is not limited particularly so long as the virtual object can move in response to a user operation. As examples of the virtual object, there are a three-dimensional shape that stands still in a virtual space, and a character that operates in a virtual space in accordance with a predetermined rule.

Further, the virtual camera corresponding to the image capturing apparatus means a virtual camera that the user can operate via the image capturing apparatus. A configuration to generate the virtual space image is not limited particularly. However, it is preferable that the generating unit 12 is configured so that a reflection of photographing can be changed in the virtual space specified by the specifying unit 11 in response to a user operation. As an example of such a configuration, there is a configuration in which a virtual image to be generated is also changed in a case where at least one of the position or the direction of the image capturing apparatus is changed. In this regard, a configuration of the virtual space image is not limited particularly. However, it is preferable that the virtual space image is configured so that at least one virtual object is drawn therein.

The outputting unit 13 has a function to output, to a display device provided with a touch panel, a synthetic image obtained by synthesizing the captured image and the virtual space image.

Here, a configuration to output the synthetic image is not limited particularly. However, it is preferable that the outputting unit 13 is configured so that the user can operate the virtual space image in the synthetic image. As an example of such a configuration, there is a configuration in which: an output position of a virtual object on the touch panel is controlled and outputted, and the synthetic image is outputted so as to execute a predetermined process in a case where a touch operation against the output position is received.

The determining unit 14 has a function to determine the content of a user operation against the touch panel.

Here, a configuration to determine the content of a user operation is not limited particularly. However, it is preferable that the determining unit 14 is configured so as to determine one operation content among a plurality of operation contents. As an example of such a configuration, there is a configuration in which whether a so-called long pressing operation or a sliding operation is received is determined on the basis of a position of the touch operation.

The updating unit 15 has a function to update, in a case where it is determined that the user operation is a first operation, a position or a posture of each of the virtual camera and the virtual object in a state where a relationship between the virtual camera and the virtual object is fixed in accordance with movement or a change in the posture of the image capturing apparatus while the first operation is continuing. In this regard, it is preferable that the movement or the change in the posture of the image capturing apparatus is synonymous with movement or a change in posture of a user terminal to which the image capturing apparatus is connected. However, this may be configured so that the image capturing apparatus can move or change the posture thereof independently from the user terminal.

Here, the first operation means an operation that satisfies a predetermined first operation condition. A configuration of the first operation is not limited particularly so long as the first operation can be distinguished from a second operation (will be described later). However, it is preferable that the first operation is an operation in which a touch position of a finger of the user or a touch pen, for example, against the touch panel does not move after the finger or the touch pen touched the touch panel.

Further, a configuration to determine whether the first operation is continuing or not is not limited particularly. The updating unit 15 may be configured so as to determine that the first operation is not continuing in a case where the first operation condition becomes unsatisfied. Alternatively, the updating unit 15 may be configured so as to determine that the first operation is continuing until a predetermined end condition is satisfied even in a case where the touch position of the finger or the like against the touch panel is lost after it is determined that the user operation is the first operation.

Further, the state where the relationship between the virtual camera and the virtual object is fixed means that the relationship of the both in the virtual space is not caused to be changed. Here, a configuration to define the relationship of the both is not limited particularly. However, it is preferable that the updating unit 15 is configured so that the relationship of a relative distance or the posture thereof. As an example of such a configuration, there is a configuration in which the virtual camera and the virtual object are caused to execute the same behavior in the virtual space. In this regard, the virtual camera and the virtual object may be configured so as to maintain a relationship of at least one of the position or the posture, or may be configured so as to maintain a relationship of both of the position and the posture.

Further, the phrase "update a position or a posture of each of the virtual camera and the virtual object (that is, the virtual camera and the like) in accordance with movement or a change in the posture of the image capturing apparatus" means that the position of the virtual camera or the like is updated in a case where the position of the image capturing apparatus in the real space is changed; or the posture of the virtual camera or the like is updated in a case where the posture of the image capturing apparatus in the real space is changed. Namely, when an imaging direction of the image capturing apparatus is changed, a photographing direction of the virtual camera is changed in the similar manner to the change, and the position of the virtual object is also moved so as to fall within a photographing area of the virtual camera. Further, when the posture of the image capturing apparatus is changed, the posture of the virtual camera is changed in the similar manner to the change, and the posture of the virtual object is also changed in the similar manner to the posture of the virtual camera. In this regard, the updating unit 15 may be configured so that the position or the posture of the virtual camera and the like is updated at the same time in a case where the movement and the change in the posture of the image capturing apparatus occur at the same time, whereby the image processing server 10A may be configured so as to provide the user with a feeling so that the image capturing apparatus works with the virtual object. Alternatively, the updating unit 15 may be configured so as to prioritize any one of the movement and the change in the posture of the virtual object and the like, whereby the image processing server 10A may be configured so as to provide features in operability thereof. As an example of the configuration of the latter, there is a configuration in which a priority condition of whether either the movement or the change in the posture of the virtual camera and the like is preferentially executed is defined in a case where the movement and the change in the posture of the image capturing apparatus are executed at the same time. In this regard, a configuration to detect the movement or the change in the posture of the image capturing apparatus is not limited particularly, and a known technique using various kinds of sensors may be utilized. Thus, its explanation herein is omitted.

The rotating unit 16 has a function to rotate the virtual object in a predetermined direction in a case where it is determined that the user operation is a second operation. The predetermined direction is defined by the second operation.

Here, the second operation means an operation that satisfies a predetermined second operation condition. A configuration of the second operation is not limited particularly so long as the second operation can be distinguished from the first operation. However, it is preferable that the second operation is an operation in which the position of the finger or the like that touches the touch panel is slid thereon (that is, an operation in which the touch position of the finger or the like is moved after the finger or the like touched the touch panel).

Further, a configuration to rotate the virtual object by the second operation is not limited particularly. However, it is preferable that it is easy for the user to predict the rotation of the virtual object. As an example of such a configuration, there is a configuration in which the virtual object is caused to rotate on its own axis in a direction from a left side of a screen to a right side of the screen in a case where it is determined that an operation to move the touch position of the finger or the like against the touch panel from the left side of the screen to the right side of the screen is the second operation. In this regard, in this case, the rotating unit 16 may be configured so that a point or an axis to cause the virtual object to rotate on its own axis is set for the virtual object in advance, or may be configured so that it is defined from a user operation.

Next, an operation of the image processing system 100 according to the present embodiment (hereinafter, referred to as a "system 100") will be described.

Figure 3:
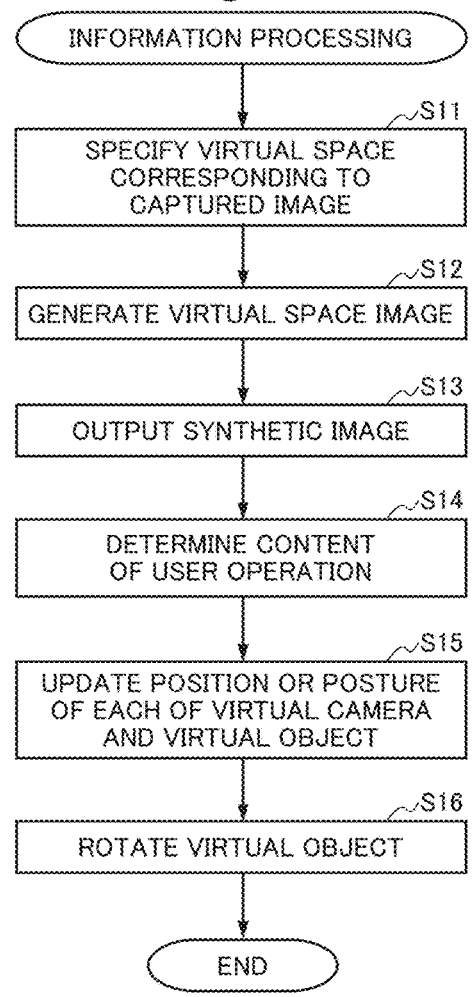
FIG. 3 is a flowchart illustrating an example of information processing corresponding to at least one of the embodiments of the present invention.

FIG. 3 is a flowchart illustrating an example of information processing executed by the system 100. Hereinafter, a case where the image processing server 10A and the user terminal 20 execute the information processing will be described as an example.

The information processing is started, for example, in a case where the user terminal 20 receives a photographing request using an AR function from the user. Hereinafter, a case where the server 10A receives the photographing request from the user terminal 20 will be described as an example.

In the information processing, the server 10A first specifies a virtual space corresponding to a captured image (Step S11). In the present embodiment, the server 10A specifies a virtual space corresponding to a captured image photographed by a camera (that is, a real camera) of the user terminal 20.

When the virtual space is specified, the server 10A generates a virtual space image (Step S12). In the present embodiment, the server 10A generates a virtual space image obtained by photographing a virtual space by means of a virtual camera that the user can operate through the camera of the user terminal 20. The virtual space includes a predetermined virtual object (a cube as an AR object).

When the virtual space image is generated, the server 10A outputs a synthetic image (Step S13). In the present embodiment, the server 10A outputs, to the display device provided with the touch panel, the synthetic image obtained by synthesizing the captured image and the virtual space image. Namely, augmented reality is realized by superimposing and displaying a virtual object photographed by the virtual camera onto a real image photographed by the real camera.

When the synthetic image is outputted, the server 10A determines the content of a user operation (Step S14). In the present embodiment, the server 10A determines the content of a user operation against the touch panel.

When the content of the user operation is determined, the server 10A updates a position or a posture of each of the virtual camera and the virtual object (Step S15). In the present embodiment, the server 10A updates, in a case where it is determined that the user operation is a first operation, a position or a posture of the virtual camera in accordance with movement or a change in the posture of the user terminal 20 while the first operation is continuing, and also updates a position or a posture of the virtual object, thereby it is possible to provide the user with a feeling to operate the virtual object in a real space via the user terminal 20.

When the position or the posture of each of the virtual camera and the virtual object is updated, the server 10A rotates the virtual object (Step S16). In the present embodiment, in a case where it is determined that the user operation is a second operation, the server 10A rotates the virtual object in a direction defined by the second operation.

Figure 4:
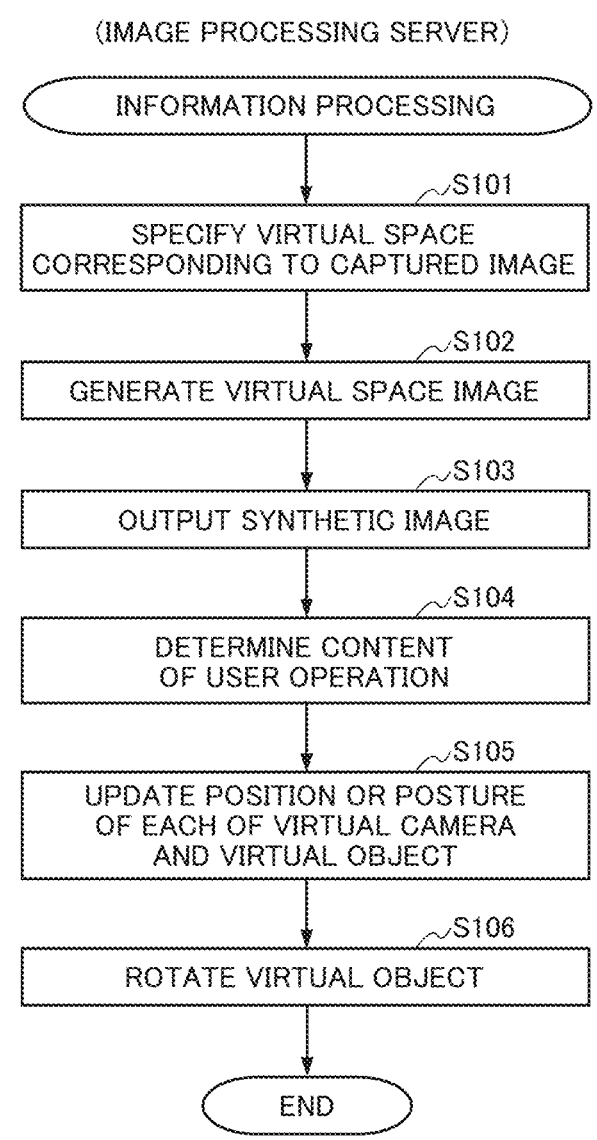
FIG. 4 is a flowchart illustrating an example of an operation of a server side in the information processing corresponding to at least one of the embodiments of the present invention.

FIG. 4 is a flowchart illustrating an example of an operation at a server 10 side in the information processing. Here, an operation of the server 10A in the system 100 will be described.

The server 10A starts the information processing, for example, by receiving, from the user terminal 20, an execution request of an AR function including information regarding a captured image. The server 10A specifies a virtual space corresponding to a captured image (Step S101); generates a virtual space image (Step S102); outputs a synthetic image (Step S103); and determines the content of a user operation (Step S104). In the present embodiment, the server 10A determines the content of the user operation against the touch panel. Then, in a case where it is determined that the user operation is a first operation, the server 10A updates a position or a posture of each of a virtual camera and a virtual object (Step S15). On the other hand, in a case where it is determined that the user operation is a second operation, the server 10A rotates the virtual object (Step S16).

Figure 5:
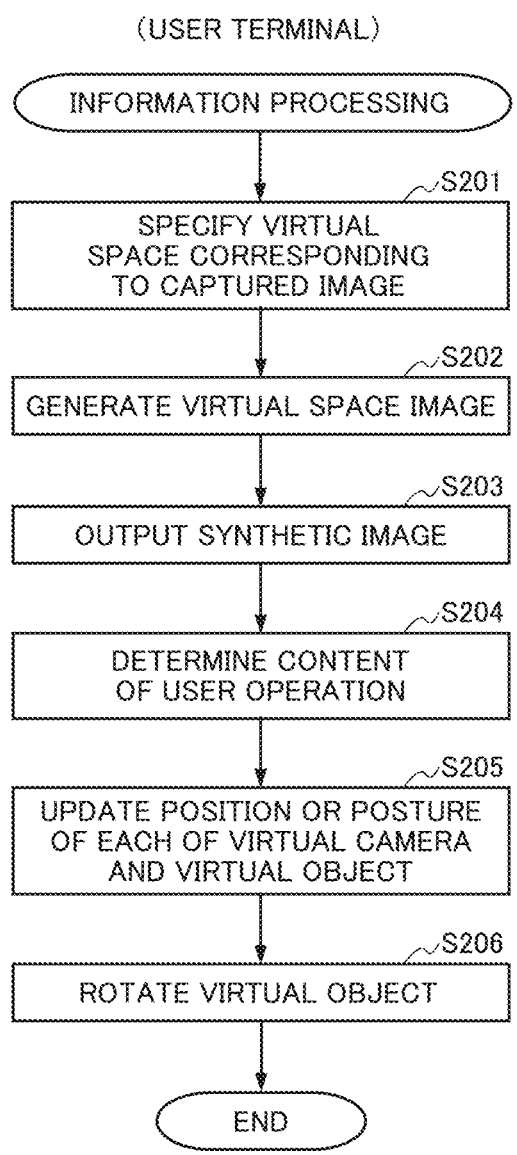
FIG. 5 is a flowchart illustrating an example of an operation of a terminal side in the information processing corresponding to at least one of the embodiments of the present invention.

FIG. 5 is a flowchart illustrating an example of an operation in a case where the user terminal 20 executes the information processing. Hereinafter, a case where a user terminal 20A (hereinafter, referred to as a "terminal 20A"), which is an example of the configuration of the user terminal 20, executes the information processing by a single body will be described as an example. In this regard, the terminal 20A is configured so as to include the similar functions to the configuration of the server 10A except for reception of various kinds of information from the server 10A. For this reason, its description is omitted from a point of view to avoid repeated explanation.

For example, in a case where a real camera connected to the terminal 20A photographs a real space, the terminal 20A starts the information processing when an execution request for an AR function is received from the user, the terminal 20A specifies a virtual space corresponding to a captured image (Step S201); generates a virtual space image (Step S202); outputs a synthetic image (Step S203); and determines the content of a user operation (Step S204). In the present embodiment, the terminal 20A determines the content of the user operation against the touch panel. Then, in a case where it is determined that the user operation is a first operation, the terminal 20A updates a position or a posture of each of a virtual camera and a virtual object (Step S205). On the other hand, in a case where it is determined that the user operation is a second operation, the terminal 20A rotates the virtual object (Step S206).

As described above, as one side of the first embodiment, the server 10A to which the image capturing apparatus included in the user terminal is connected is configured so as to include the specifying unit 11, the generating unit 12, the outputting unit 13, the determining unit 14, the updating unit 15, and the rotating unit 16. Thus, the specifying unit 11 specifies the virtual space corresponding to the captured image taken by the image capturing apparatus; the generating unit 12 generates the virtual space image obtained by photographing the virtual space, which includes at least one virtual object, by means of the virtual camera corresponding to the image capturing apparatus; the outputting unit 13 outputs the synthetic image, obtained by synthesizing the captured image and the virtual space image, to the display device provided with the touch panel; the determining unit 14 determines the content of the user operation against the touch panel; the updating unit 15 updates, in a case where it is determined that the user operation is the first operation, the position or the posture of each of the virtual camera and the virtual object in the state where the relationship between the virtual camera and the virtual object is fixed in accordance with the movement or the change in the posture of the image capturing apparatus while the first operation is continuing, the first operation being the operation in which the touch position does not move after the finger or the like touched the touch panel; and the rotating unit 16 rotates the virtual object in the predetermined direction in a case where it is determined that the user operation is the second operation in which the position of the finger or the like that touches the touch panel is slid, the predetermined direction being defined by the second operation. Therefore, it is possible to improve operability of the virtual object, that is, the AR object.

Namely, as a configuration for causing the user to operate the AR object, the image processing server 10A is configured so that the first operation in which an operation against the touch panel and the image capturing apparatus is received and the second operation in which the sliding operation is received can be received in the same situation. Therefore, it is possible to further improve operability of the AR object compared with a case where one kind of operation method is received.

Second Embodiment

Figure 6:
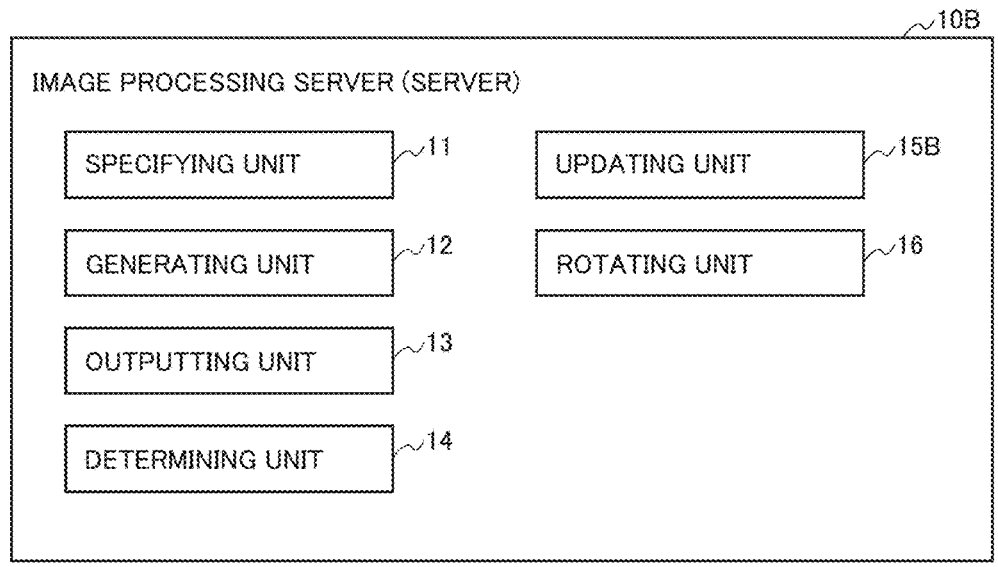
FIG. 6 is a block diagram illustrating a configuration of a server corresponding to at least one of the embodiments of the present invention.

FIG. 6 is a block diagram illustrating a configuration of an image processing server 10B (hereinafter, referred to as a "server 10B"), which is an example of the image processing server 10. In the present embodiment, the server 10B at least includes a specifying unit 11, a generating unit 12, an outputting unit 13, a determining unit 14, an updating unit 15B, and a rotating unit 16.

The updating unit 15B has a function to update a position or a posture of a virtual object in a virtual space, which is displayed at a touch position of a first operation.

Here, a configuration to specify a virtual object displayed at the touch position is not limited particularly. The specifying unit 11 may be configured so as to specify the virtual object by comparing a coordinate of the touch position with a coordinate of the virtual object, and may be configured so as to specify a plurality of virtual objects at the same time.

Figure 7:
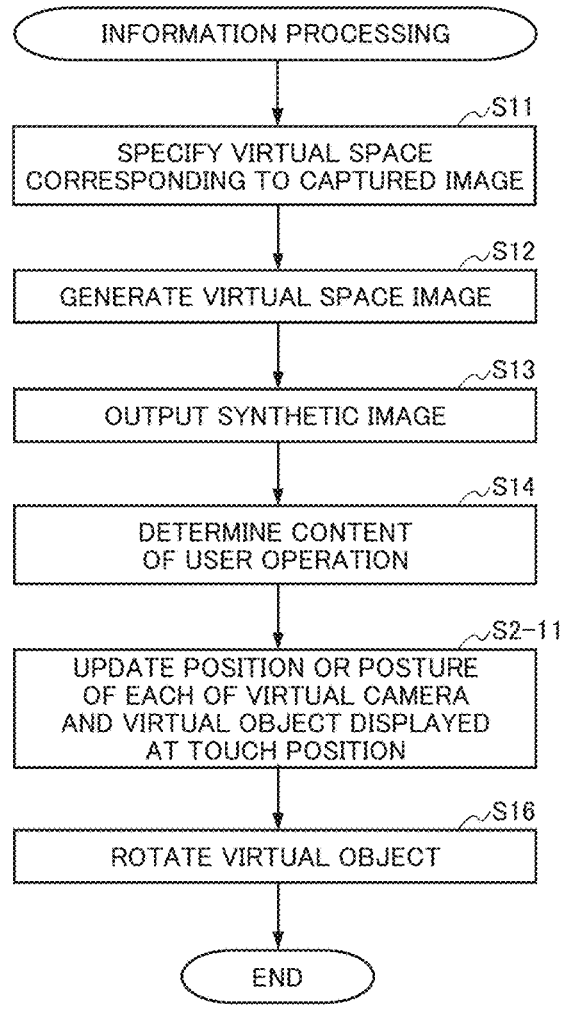
FIG. 7 is a flowchart illustrating an example of information processing corresponding to at least one of the embodiments of the present invention.

FIG. 7 is a flowchart illustrating an example of information processing executed by an image processing system 100 (hereinafter, referred to as a "system 100"). Hereinafter, operations of the server 10B and a user terminal 20 (hereinafter, referred to as a "terminal 20") will be described as an example. In this regard, a flowchart illustrating an operation of each of the server 10B and the terminal 20 is omitted from a point of view to avoid repeated explanation.

In the information processing, when the content of a user operation is determined, the server 10B updates a position or a posture of each of a virtual camera and a virtual object displayed at a touch position (Step S2-11). In the present embodiment, the server 10B sets the virtual object displayed at a touch position of a first operation to an operation state; and updates, whenever information indicating that at least one of a position or a posture of the terminal 20 or a camera included in the terminal 20 is changed is received from the terminal 20 while a touch operation of a user is continuing, information regarding the virtual object so that the virtual object in the virtual space is changed in the similar manner to the change.

As explained above, as one side of the second embodiment, the server 10B is configured so as to include the specifying unit 11, the generating unit 12, the outputting unit 13, the determining unit 14, the updating unit 15B, and the rotating unit 16. Thus, the updating unit 15B updates the position or the posture of the virtual object displayed at the touch position of the first operation in the virtual space. Therefore, it is possible to causes the user to intuitively designate an operational target.

Third Embodiment

Figure 8:
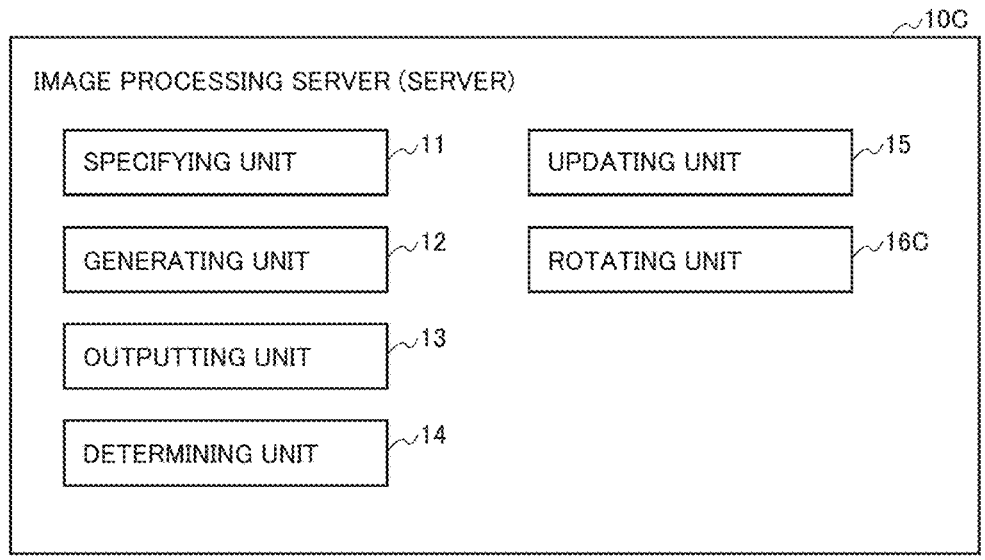
FIG. 8 is a block diagram illustrating a configuration of a server corresponding to at least one of the embodiments of the present invention.

FIG. 8 is a block diagram illustrating a configuration of an image processing server 10C (hereinafter, referred to as a "server 10C"), which is an example of the image processing server 10. In the present embodiment, the server 10C at least includes a specifying unit 11, a generating unit 12, an outputting unit 13, a determining unit 14, an updating unit 15, and a rotating unit 16C.

The rotating unit 16C has a function to rotate a virtual object in a state where a position of the virtual object in a virtual space is fixed.

Here, a configuration to rotate the virtual object in a state where the position of the virtual object is fixed is not limited particularly. However, it is preferable that the rotating unit 16C is configured so that a reference position of the virtual object (for example, a coordinate of the center of gravity) is not changed before and after the rotation. As an example of such a configuration, there is a configuration in which even though a position or a posture of the terminal 20 or a camera of the terminal 20 is changed in a predetermined erroneous operation range during rotation of the virtual object while a second operation is received, it is possible to prevent this from influencing the position or a posture of the virtual object in the virtual space.

Figure 9:
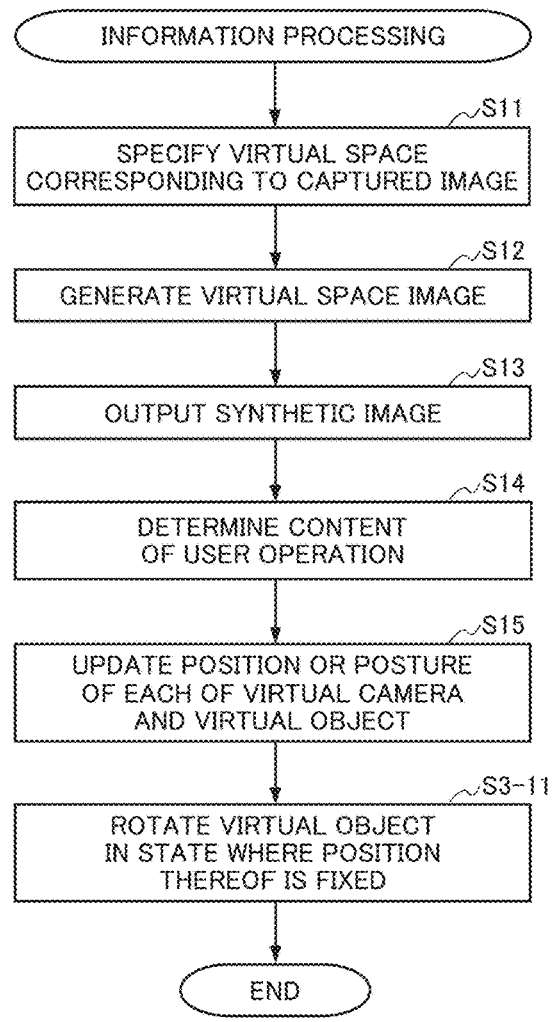
FIG. 9 is a flowchart illustrating an example of information processing corresponding to at least one of the embodiments of the present invention.

FIG. 9 is a flowchart illustrating an example of information processing executed by an image processing system 100. Hereinafter, operations of the server 10C and the terminal 20 will be described as an example. In this regard, a flowchart illustrating an operation of each of the server 10C and the terminal 20 is omitted from a point of view to avoid repeated explanation.

When a position or a posture of each of a virtual camera and a virtual object is updated, the server 10C rotates the virtual object in a state where the position thereof is fixed (Step S3-11). In the present embodiment, in a case where it is determined that a user operation is a second operation, the server 10C fixes the position of the virtual object in the virtual space, and rotates the virtual object in a direction defined by the second operation.

As explained above, as one side of the third embodiment, the server 10C is configured so as to include the specifying unit 11, the generating unit 12, the outputting unit 13, the determining unit 14, the updating unit 15, and the rotating unit 16C. Thus, the rotating unit 16C rotates the virtual object in a state where the position of the virtual object in the virtual space is fixed. Therefore, it is possible to prevent the erroneous operation by a user, and this makes it possible to further improve operability of an AR object.

Fourth Embodiment

Figure 10:
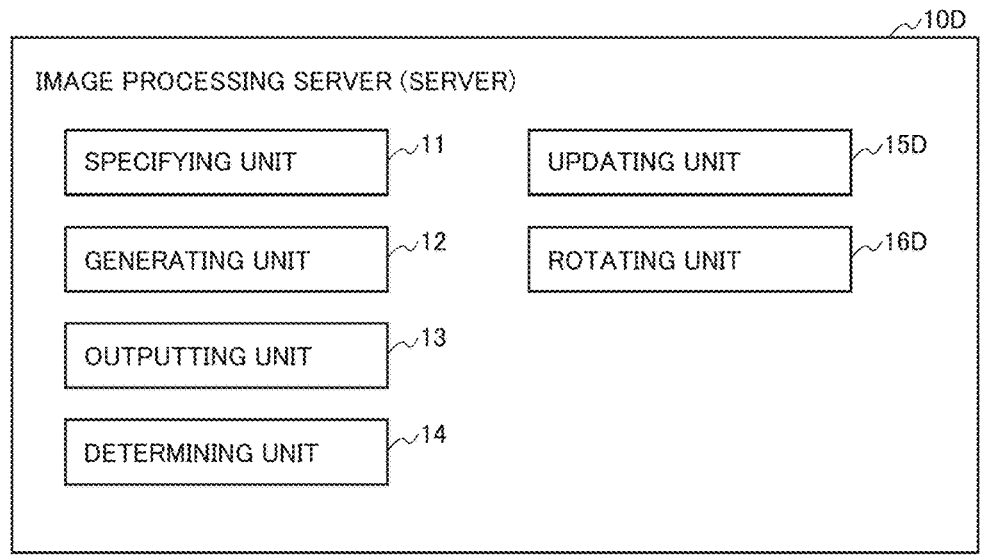
FIG. 10 is a block diagram illustrating a configuration of a server corresponding to at least one of the embodiments of the present invention.

FIG. 10 is a block diagram illustrating an image processing server 10D (hereinafter, referred to as a "server 10D"), which is an example of the image processing server 10. In the present embodiment, the server 10D at least includes a specifying unit 11, a generating unit 12, an outputting unit 13, a determining unit 14, an updating unit 15D, and a rotating unit 16D.

The updating unit 15D has a function to update a posture of a virtual object so as to rotate the virtual object around a photographing direction of a virtual camera in a case where it is determined that a received user operation is a first operation and a posture of a user terminal 20 (hereinafter, referred to as a "terminal 20") is rotated by using an imaging direction of an image capturing apparatus as an axis. Namely, the updating unit 15D has a function to control the virtual object to rotate the virtual object in the similar manner to rotation of the image capturing apparatus in a real space.

Here, a configuration to update a posture of a virtual object so as to rotate the virtual object around a photographing direction of a virtual camera is not limited particularly.

The updating unit 15D may be configured so as to set the axis from a touch position of the first operation to a depth direction of a touch panel, or may be configured so that a position for setting the axis to the virtual object is defined in advance. As an example of such a configuration, there is a configuration in which in a case where the virtual object is rotated around the photographing direction of the virtual camera, an axis passing through a predetermined position of the virtual object (for example, the center of gravity) is set.

The rotating unit 16D has a function to rotate the virtual object around a direction orthogonal to the photographing direction of the virtual camera in a case where it is determined that the user operation is a second operation in which a position of a finger of the user or a touch pen, for example, that touches the touch panel is slid.

Here, a configuration to rotate the virtual object around a direction orthogonal to the photographing direction of the virtual camera is not limited particularly. However, it is preferable that the server 10D is configured so that the virtual object can be rotated three-dimensionally by means of the updating unit 15D and the rotating unit 16D. As an example of such a configuration, there is a configuration in which in a case where it is determined that a sliding direction as the second operation is a horizontal direction of the touch panel, an axis of rotation of the virtual object is set to a vertical direction of a virtual space; and in a case where it is determined that the sliding direction as the second operation is the vertical direction of the touch panel, the axis of rotation of the virtual object is set to the horizontal direction of the virtual space. Further, the server 10D may be configured so that in a case where it is determined that the sliding direction as the second operation is an oblique direction, the axis of rotation of the virtual object is set to an oblique direction of the virtual space.

Figure 11:
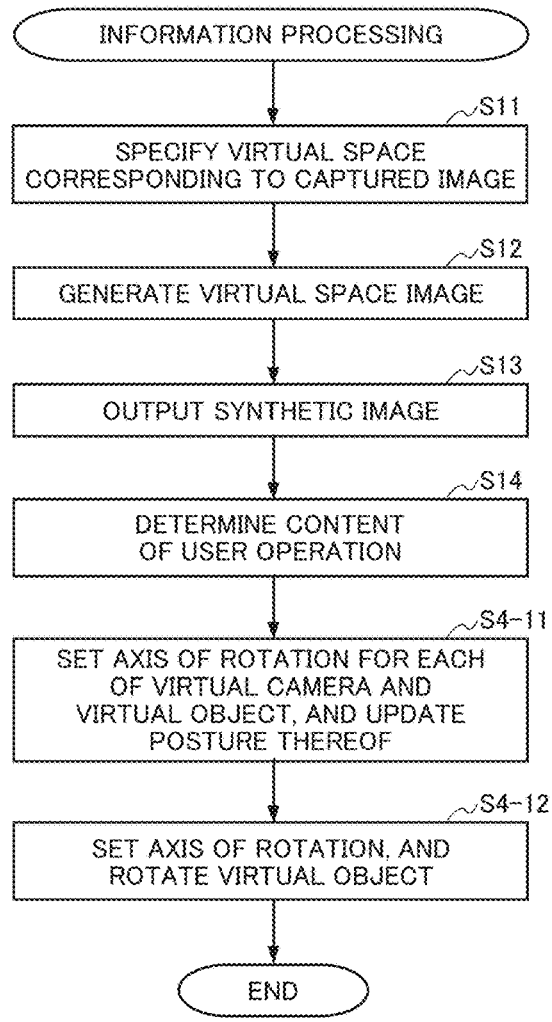
FIG. 11 is a flowchart illustrating an example of information processing corresponding to at least one of the embodiments of the present invention.

FIG. 11 is a flowchart illustrating an example of information processing executed by an image processing system 100. Hereinafter, operations of the server 10D and the terminal 20 will be described as an example. In this regard, a flowchart illustrating an operation of each of the server 10D and the terminal 20 is omitted from a point of view to avoid repeated explanation.

When the content of a user operation is determined, the server 10D sets an axis of rotation to each of the virtual camera and the virtual object, and updates postures thereof (Step S4-11). In the present embodiment, in a case where it is determined that the user operation is a first operation, the server 10D sets a photographing direction of the virtual camera to the axis of rotation to rotate the virtual camera and the virtual object around an imaging direction of a camera by the terminal 20 while the first operation is continuing, and updates the postures thereof so that the virtual camera and the virtual object are rotated in accordance with the rotation of the terminal 20 or the camera.

When the postures of the virtual camera and the virtual object are updated, the server 10D (that is, the rotating unit 16D) sets the axis of rotation to rotate the virtual object (Step S4-12). In the present embodiment, in a case where it is determined that the user operation is a second operation (that is, a sliding operation), the server 10D specifies a direction of the second operation on a touch panel of the terminal 20 while the second operation is continuing; sets the axis of rotation so that the virtual object is rotated in the specified direction; and rotates the virtual object in the set direction.

As explained above, as one side of the fourth embodiment, the server 10D is configured so as to include the specifying unit 11, the generating unit 12, the outputting unit 13, the determining unit 14, the updating unit 15D, and the rotating unit 16D. Thus, the updating unit 15D updates the posture of the virtual object so as to rotate the virtual object around the photographing direction of the virtual camera in a case where it is determined that the received user operation is the first operation and the posture of the terminal 20 is rotated around the imaging direction of the image capturing apparatus; and the rotating unit 16D rotates the virtual object around the direction orthogonal to the photographing direction of the virtual camera in a case where it is determined that the received user operation is the second operation in which the position of the finger or the like that touches the touch panel is slid. Therefore, it is possible to three-dimensionally control a posture of an AR object by means of two kinds of operations, and this makes it possible to further improve operability of the AR object.

Fifth Embodiment

Figure 12:
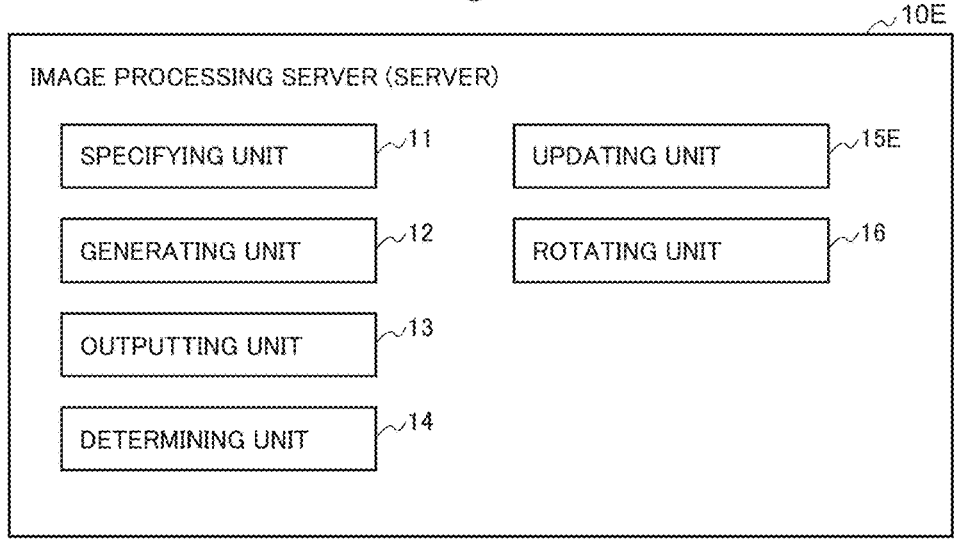
FIG. 12 is a block diagram illustrating a configuration of a server corresponding to at least one of the embodiments of the present invention.

FIG. 12 is a block diagram illustrating a configuration of an image processing server 10E (hereinafter, referred to as a "server 10E"), which is an example of the server 10. In the present embodiment, the server 10E at least includes a specifying unit 11, a generating unit 12, an outputting unit 13, a determining unit 14, an updating unit 15E, and a rotating unit 16.

The updating unit 15E has a function to change from a state where a relationship between a virtual camera and a virtual object is fixed to a state where the relationship thereof is not fixed and update the state in a case where a predetermined condition in a virtual space is satisfied while a first operation is continuing.

Here, the content of the predetermined condition is not limited particularly. However, it is preferable that the predetermined condition has the content that a user can grasp. As examples of the predetermined condition, there are a condition that a predetermined time elapses after the first operation starts, and a condition that a virtual object touches another object in a virtual space.

Further, a configuration to change from a state where a relationship between a virtual camera and a virtual object is fixed to a state where the relationship thereof is not fixed is not limited particularly. However, it is preferable that the updating unit 15E is configured so that the user can grasp that it does not become the fixed state. As examples of such a configuration, there are a configuration in which a virtual object that does not become a fixed state is caused to stay on the spot in the virtual space, and a configuration in which a virtual object is caused to move to a predetermined position.

Figure 13:
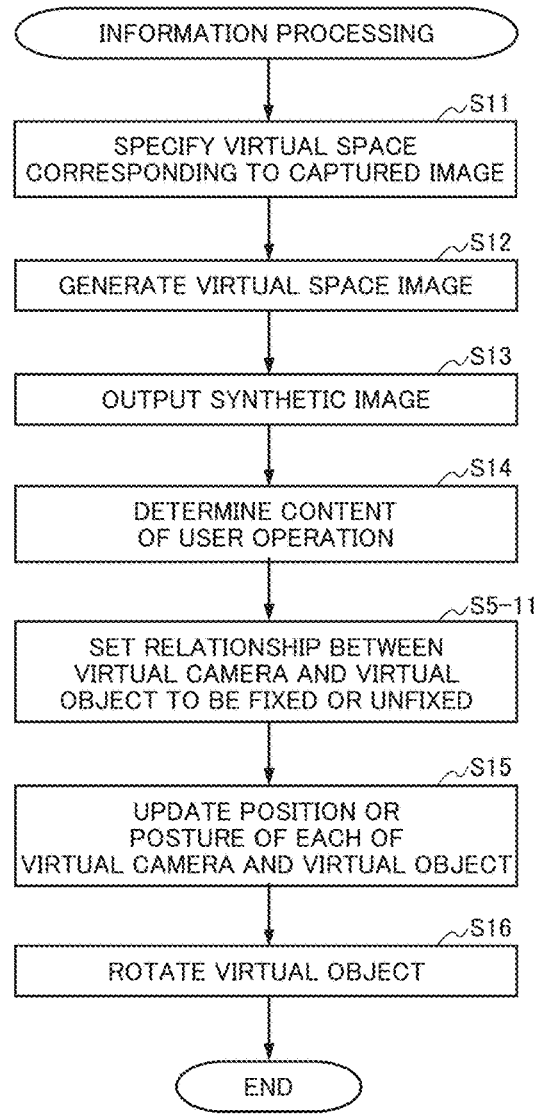
FIG. 13 is a flowchart illustrating an example of information processing corresponding to at least one of the embodiments of the present invention.

FIG. 13 is a flowchart illustrating an example of information processing executed by an image processing system 100. Hereinafter, operations of the server 10E and a user terminal 20 (hereinafter, referred to as a "terminal 20") will be described as an example. In this regard, a flowchart illustrating an operation of each of the server 10E and the terminal 20 is omitted from a point of view to avoid repeated explanation.

When the content of a user operation is determined as a first operation, the server 10E (that is, the updating unit 15E) sets a relationship between a virtual camera and a virtual object to either a fixed state or a non-fixed state while the first operation is continuing (Step S5-11). In the present embodiment, in a case where a virtual object designated by the first operation does not touch any other virtual object, the server 10E fixes the relationship between the virtual camera and the virtual object; controls the terminal 20 so that the virtual camera is moved or a posture thereof is changed in accordance with movement or a change in a posture of the terminal 20 or a camera of the terminal 20; and causes the virtual camera and the virtual object set to the fixed state to move or change the posture thereof. Further, in a case where the virtual object designated by the first operation touches any other virtual object, the server 10E sets the relationship between the virtual camera and the virtual object to the non-fixed state; controls the terminal 20 so that the virtual camera is moved or the posture thereof is changed in accordance with the movement or the change in the posture of the terminal 20 or the camera of the terminal 20; and causes the virtual camera and the virtual object set to the non-fixed state to stand still at a position that satisfies a predetermined condition.

As explained above, as one side of the fifth embodiment, the server 10E is configured so as to include the specifying unit 11, the generating unit 12, the outputting unit 13, the determining unit 14, the updating unit 15E, and the rotating unit 16. Thus, in a case where a predetermined condition in the virtual space is satisfied while the first operation is continuing, the updating unit 15E changes the relationship between the virtual camera and the virtual object from the fixed state to the non-fixed state, and updates the relationship. Therefore, it becomes possible to reflect a situation of the virtual space to an operation against an AR object, and this makes it possible to further improve operability of the AR object.

Sixth Embodiment

Figures 14, 15:
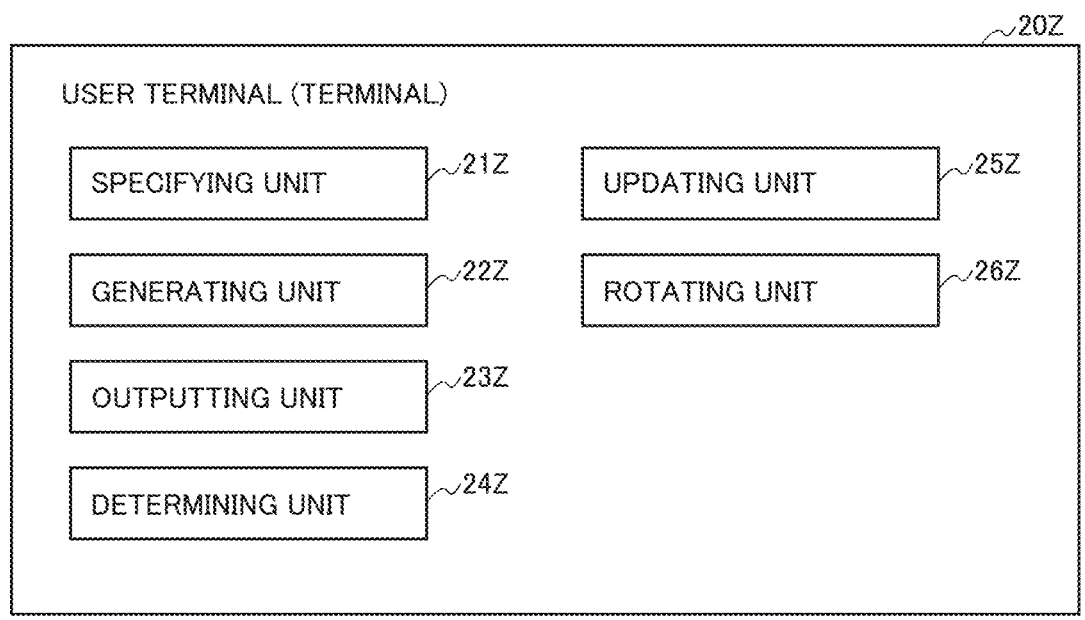
FIG. 14 is a block diagram illustrating a configuration of a server corresponding to at least one of the embodiments of the present invention.
FIG. 15 is an explanatory drawing for explaining an example of a storage state of information corresponding to at least one of the embodiments of the present invention.

FIG. 14 is a block diagram illustrating a configuration of a user terminal 20Z (hereinafter, referred to as a "terminal 20Z"), which is an example of the user terminal 20 in an image processing system 100 (see FIG. 1). In the present embodiment, the terminal 20Z at least includes a specifying unit 21Z, a generating unit 22Z, an outputting unit 23Z, a determining unit 24Z, an updating unit 25Z, and a rotating unit 26Z.

The terminal 20Z has a function to realize an operation to move or rotate an object in an AR space by causing a user to have a feeling to hold the object by means of a hand of the user or lazy tongs (or a magic hand). Hereinafter, a case where an object existing in an AR space is caused to move or rotate by moving or rotating a body of the terminal 20Z as a smartphone or swiping a screen of the terminal 20Z will be described.

The specifying unit 21Z has a function to specify a virtual space corresponding to a captured image taken by an image capturing apparatus.

Here, as an example of the image capturing apparatus, there is a camera connected to the terminal 20Z. Further, as an example of the virtual space corresponding to the captured image, there is a virtual space that is defined in advance for photographing an AR object to be superimposed and displayed on the captured image. Namely, the terminal 20Z associates a real space with the virtual space, thereby specifying a so-called AR space.

The generating unit 22Z has a function to generate a virtual space image obtained by photographing a virtual space by means of a virtual camera corresponding to the image capturing apparatus. The virtual space includes at least one virtual object.

Here, as an example of the virtual object, there is a three-dimensional object. Further, a configuration to generate the virtual space image is not limited particularly. However, it is preferable that a state where any virtual object is not arranged in a virtual space can occur. As an example of such a configuration, there is a configuration in which: information on a virtual space in a state where any virtual object has not been arranged in the virtual space yet is specified; a virtual object is arranged in the virtual space in accordance with a predetermined rule; the virtual space after arrangement is photographed by the virtual camera; and a virtual space image is then generated. Namely, by photographing the virtual space, the generating unit 22Z may generate a virtual space image in which any virtual object is not included, or may generate a virtual space image in which a virtual object is included. By configuring the terminal 20Z in such a manner, it is also possible to cause a user to realize a mode in which a synthetic image (or an AR image) changes from a state where any virtual object is not displayed to a state where a virtual object is displayed, and this makes it possible to cause operability of the AR object have variety.

The outputting unit 23Z has a function to output, to a display device provided with a touch panel, a synthetic image obtained by synthesizing the captured image and the virtual space image.

Here, as an example of the synthetic image, there is a so-called AR image obtained by synthesizing a real space image and a virtual space image. By specifying the virtual space corresponding to the real space, the user is allowed to operate the virtual object. Therefore, it is possible to realize augmented reality.

The determining unit 24Z has a function to determine the content of a user operation against the touch panel.

Here, as examples of the user operation, there are movement or a change in a posture of the terminal 20Z, and a touch operation against the touch panel of the terminal 20Z.

The updating unit 25Z has a function to update, in a case where it is determined that the user operation is a first operation, a position or a posture of each of the virtual camera and the virtual object in a state where a relationship between the virtual camera and the virtual object is fixed in accordance with movement or a change in the posture of the image capturing apparatus while the first operation is continuing.

Here, as examples of the first operation, there are operations, such as a so-called holding or a long touch, in each of which a touch position of a finger of the user or a touch pen, for example, does not move after the finger or the like touched the touch panel. By fixing the relationship between the virtual camera and the virtual object while the first operation is continuing, it is possible to provide the user with an operation system for moving or rotating the terminal 20Z with the feeling to hold the object in the AR space by means of his or her hand or the lazy tongs in a case where the user who holds the terminal 20Z by his or her hand moves the terminal 20Z.

Further, as an example of the state where the relationship between the virtual camera and the virtual object is fixed, there is a state where in a case where the position or the posture of the virtual camera in the virtual space is changed in accordance with the movement or the change in the posture of the terminal 20Z, a position or a posture of the virtual object is changed in the similar manner.

In this regard, in a case where it is determined that the user operation is an operation to change the posture of the terminal 20Z without touching the touch panel, the updating unit 25Z updates only the position or the posture of the virtual camera. Namely, in a case where the AR space is specified after activation of the camera, the updating unit 25Z moves the virtual camera in response to the movement of the camera. However, the updating unit 25Z may not move the virtual object in the virtual space.

The rotating unit 26Z has a function to rotate the virtual object in a predetermined direction in a case where it is determined that the user operation is a second operation. The predetermined direction is defined by the second operation.

Here, as examples of the second operation, there are an operation to slide the position of the finger or the like that touches the touch panel, and so-called swiping.

FIG. 15 is an explanatory drawing for explaining an example of a storage state of information stored in a storage unit (not illustrated in FIG. 14) included in the terminal 20Z. As illustrated in FIG. 15, an operational target, a coordinate, and a posture are stored in the storage unit so as to be associated with an axis of rotation.

Here, as an example of the operational target, there is a virtual object specified by a user operation. Further, as an example of the coordinate, there is a position of a feature point of the operational target in a three-dimensional space. Further, as an example of the posture, there is a position of one feature point or each of a plurality of feature points for specifying the posture of the operational target. Moreover, as an example of the axis of rotation, there is an axis that is selected or defined when the operational target is rotated.

Figure 16:
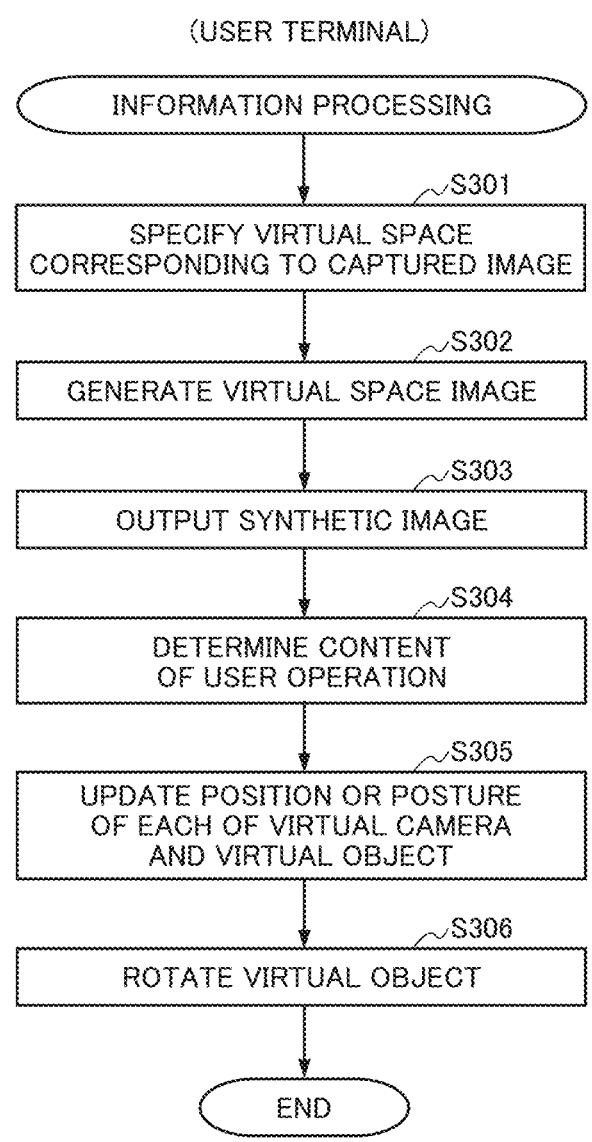
FIG. 16 is a flowchart illustrating an example of information processing corresponding to at least one of the embodiments of the present invention.

FIG. 16 is a flowchart illustrating an example of information processing executed by the terminal 20Z. In the information processing according to the present embodiment, processing for controlling a virtual object (that is, an AR object) superimposed and displayed on an image of a real space in response to a user operation is executed. Hereinafter, each of processes will be described. In this regard, the order of each of the processes may be changed without any contradiction or the like of processing content.

The information processing is started, for example, in a case where the terminal 20Z receives a photographing request using an AR function from a user. Hereinafter, a case where the terminal 20Z receives a photographing request will be described as an example.

In the information processing, the terminal 20Z first specifies, as the specifying unit 21Z, a virtual space corresponding to a captured image (Step S301). In the present embodiment, the terminal 20Z specifies a reference position from the captured image photographed by a camera (that is, a real camera) of the terminal 20Z, and specifies a virtual space, in which a plurality of virtual objects is arranged, on the basis of the specified reference position.

When the virtual space is specified, the terminal 20Z generates, as the generating unit 22Z, a virtual space image (Step S302). In the present embodiment, the terminal 20Z generates a virtual space image obtained by photographing the virtual space by means of a virtual camera that can be operated via the camera of the terminal 20Z.

When the virtual space image is generated, the terminal 20Z outputs, as the outputting unit 23Z, a synthetic image (Step S303). In the present embodiment, the terminal 20Z output, to a display device provided with a touch panel, a synthetic image obtained by synthesizing a real image and a virtual space image. The virtual space image is obtained by photographing the virtual space including a plurality of virtual objects.

When the synthetic image is outputted, the terminal 20Z, as the determining unit 24Z, determines the content of a user operation (Step S304). In the present embodiment, the terminal 20Z determines the content of a user operation against the touch panel.

When the content of the user operation is determined, the terminal 20Z updates, as the updating unit 25Z, a position or a posture of each of the virtual camera and the virtual object (Step S305). In the present embodiment, when the terminal 20Z receives, from the user, an operation (one example of a first operation) to hold any one of a plurality of objects (that is, AR objects) displayed on the screen of the terminal 20Z (that is, a long touch) and move the body of the terminal 20Z while maintaining such a state, the terminal 20Z controls so that the held AR object is moved by the same distance. Further, when the terminal 20Z receives, from the user, an operation (another example of the first operation) to rotate the terminal 20Z while maintaining the above state, the terminal 20Z controls so that the held AR object is rotatively moved around a coordinate of the terminal 20Z. In this regard, in a case where the finger or the like goes away from the screen, the terminal 20Z determines that the operation is terminated.

When the position or the posture of each of the virtual camera and the virtual object is updated, the terminal 20Z rotates the virtual object as the rotating unit 26Z (Step S306). In the present embodiment, when the terminal 20Z receives an operation to swipe the screen (one example of the second operation), the terminal 20Z controls so that the AR object is rotated on the spot. Here, the terminal 20Z causes the AR object to execute a yawing rotation by receiving a horizontal swipe, and the terminal 20Z causes the AR object to execute a pitching rotation by using a vertical swipe. In this regard, a rolling rotation is involved in an operation to rotate the terminal 20Z. In this regard, the terminal 20Z may be configured so that the above controls are executed at the same time, or may be configured so that each of the above controls is executed independently.

Figure 17:
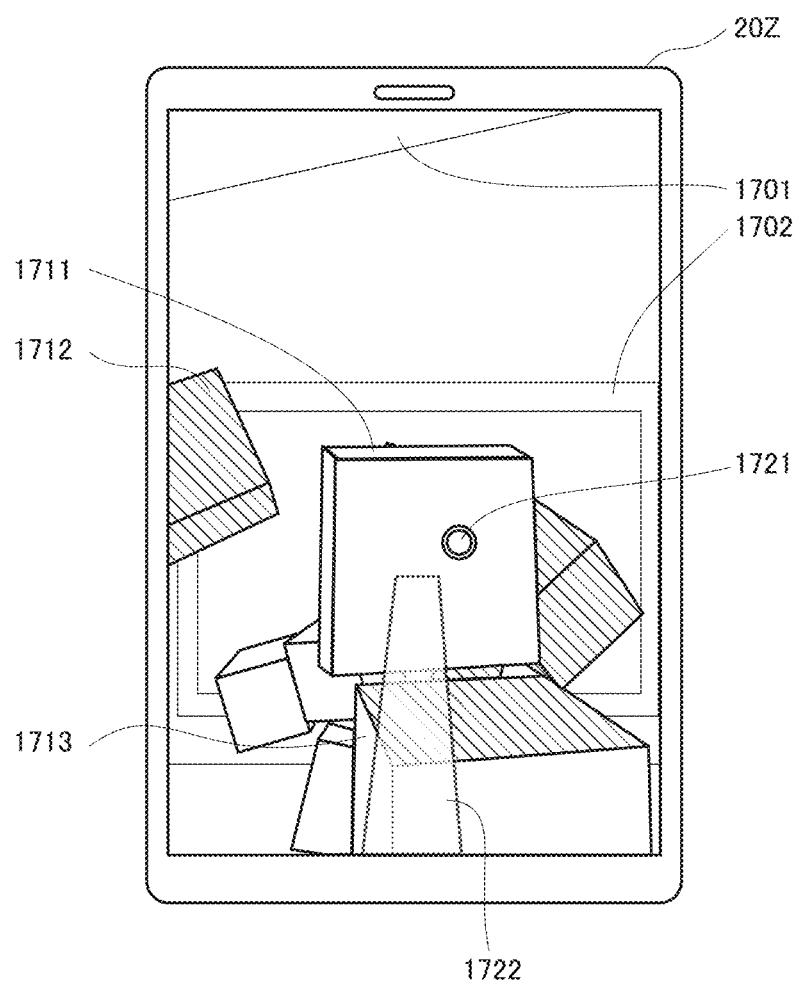
FIG. 17 is an explanatory drawing illustrating an example of a display screen corresponding to at least one of the embodiments of the present invention.

FIG. 17 is an explanatory drawing for explaining an example of the synthetic image. As illustrated in FIG. 17, a ceiling 1701 in a real space, a display 1702 in the real space, a plurality of AR objects 1711, 1712, and 1713, a touch position image 1721, and an indication image 1722 are displayed on a display screen of the terminal 20Z on which the synthetic image is displayed.

Here, each of the ceiling 1701 and the display 1702 in the real space is an image that is photographed by the camera included in the terminal 20Z.

Further, each of the plurality of AR objects 1711, 1712, and 1713 is an image obtained by photographing a virtual object arranged in the virtual space by means of the virtual camera. In the present embodiment, the indication image 1722 is displayed during an operation against the AR object 1711 that becomes the operational target. The indication image 1722 is formed by an object with a predetermined thickness, which is obtained by connecting the operational target to the terminal 20Z (that is, a lower side of the display screen). Further, a color of the indication image 1722 changes in accordance with a distance from the lower side to the operational target. Moreover, a light is provided at a center of the operational target during the operation against the AR object 1711. The light illuminates objects in the vicinity of the AR object 1711, whereby it is possible for a user to visually recognize a positional relationship easily. In FIG. 17, the AR object 1712 positioned behind the AR object 1711, and a part or all of a display area of the AR object 1713 are illuminated by the light provided at the center of the AR object 1711.

Further, the touch position image 1721 is an image indicating a touch of the user. A configuration of the touch position image 1721 is not limited particularly. The touch position image 1721 may be configured so as to inform the user of information other than the touch position. As an example of such a configuration, there is a configuration in which presence or absence of an operational target, a kind of the operational target, or a state thereof is displayed so that the user can identify it.

In this regard, a configuration of the display screen is not limited particularly so long as the user is caused to operate an AR image. Namely, for example, the display screen may be configured so that a virtual object that influences the AR object but that the user cannot operate is displayed, or may be configured so that a UI indicating an operation time is displayed.

Further, the display screen may be configured so as to include a function other than display of an image as a function regarding an operation against the AR object. As an example of such a configuration, there is a configuration in which a vibrating unit for vibrating the terminal 20Z is provided whenever the AR object as the operational target is moved by a fixed distance. By configuring the terminal 20Z in this manner, it is possible for the user to easily recognize a distance by which the AR object is moved actually. Namely, when the terminal 20Z is moved while the finger or the like touches the display screen after the real space is associated with the virtual space, the operational target is also moved in the virtual space. At this time, a size of the virtual object on the display screen changes in accordance with a positional relationship with the virtual camera. For that reason, the user may feel difficulty in accurate recognition of a movement distance even with respect to the same operational target between a case where a display size thereof is large and a case where the display size thereof is small. Thus, by providing a function to inform the user of that effect whenever the operational target is moved by the fixed distance in the virtual space, it is possible to further improve operability of the AR object.

As explained above, as one side of the sixth embodiment, the user terminal 20Z provided with the image capturing apparatus is configured so as to include the specifying unit 21Z, the generating unit 22Z, the outputting unit 23Z, the determining unit 24Z, the updating unit 25Z, and the rotating unit 26Z. Thus, the specifying unit 21Z specifies the virtual space corresponding to the captured image taken by the image capturing apparatus; the generating unit 22Z generates the virtual space image obtained by photographing the virtual space, which includes at least one virtual object, by means of the virtual camera corresponding to the image capturing apparatus (for example, the generating unit 22Z generates an image of a virtual object containing coordinate information); the outputting unit 23Z outputs the synthetic image, obtained by synthesizing the captured image and the virtual space image, to the display device provided with the touch panel; the determining unit 24Z determines the content of the user operation against the touch panel; the updating unit 25Z updates, in a case where it is determined that the user operation is the first operation (for example, in a case where the terminal 20Z is held), the position or the posture of each of the virtual camera and the virtual object in the state where the relationship between the virtual camera and the virtual object is fixed in accordance with the movement or the change in the posture of the image capturing apparatus while the first operation is continuing, the first operation being the operation in which the touch position against the touch panel does not move after the finger or the like touched the touch panel; and the rotating unit 26Z rotates the virtual object in the predetermined direction in a case where it is determined that the user operation is the second operation in which the position of the finger or the like that touches the touch panel is slid (for example, in a case where the screen is swiped), the predetermined direction being defined by the second operation. Therefore, it is possible to improve operability of the virtual object, that is, the AR object.

Namely, by matching a motion of the user (in particular, a motion of his or her hand), who operates the terminal 20Z by one hand, with movement of the AR object, it becomes possible for the user to operate the AR object intuitively. Further, it is possible to improve trackability and operate the AR object stably compared with a method of detecting a hand gesture from an image, for example. Moreover, by configuring so that the terminal 20Z provided with camera the is caused to execute various kinds of processes, it is also useful that any additional equipment is not required therefor.

Further, in the sixth embodiment described above, the configuration in which the user terminal 20Z displays the object extending from the predetermined position toward the AR object that becomes the operational target has been described. However, a configuration of the object (that is, a designated object) is not limited particularly so long as the configuration is a configuration in which the user can be caused to recognize the operational target. As an example of the configuration of the designated object, there is a configuration in which a form (color or a shape) thereof is changed on the basis of a distance from a position of the terminal 20Z in the virtual space to the operational object in accordance with a predetermined rule.

Further, in the sixth embodiment described above, the configuration in which the user terminal 20Z provides the light at the center of the operational target in a case where the user operates the AR object has been described. However, a configuration to provide the light is not limited particularly so long as the configuration is a configuration in which the user is caused to easily recognize a positional relationship among a plurality of AR objects in the virtual space or the synthetic image. As an example of such a configuration, there are a configuration in which a light that emits light with predetermined color to an object as an operational target is provided, and a configuration in which a light that emits light with emission color, which changes in accordance with a specific rule, to an operational target or an object, which is selected in accordance with a predetermined rule, is provided (for example, a configuration in which a color light that emits light with color, which changes in accordance with a positional relationship between an operational target and another object, is provided).

In this regard, it has not been mentioned particularly in the sixth embodiment described above. However, the user terminal 20Z may be configured so as to adopt a character appearing in the video game as the virtual object as a part of the functions to control progress of the video game. In this case, the user terminal 20Z may be configured so that various kinds of parameters each of which changes in accordance with progress of the video game are reflected to the AR space. As an example of such a configuration, there is a configuration in which a change in a form of a character in the video game is reflected to a form of a virtual object in the AR space.

As explained above, one or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 20, 201 to 20n and the server 10 executes the various kinds of processing described above in accordance with various kinds of control programs (for example, an image processing program)

stored in the storage device with which the corresponding terminal or server is provided.

Further, the configuration of the system 100 is not limited to the configuration that has been explained as an example of each of the embodiments described above. For example, the system 100 may be configured so that the server 10 executes a part or all of the processes that have been explained as the processes executed by the user terminal 20. Alternatively, the system 100 may be configured so that any of the plurality of user terminals 20, 201 to 20n (for example, the user terminal 20) executes a part or all of the processes that have been explained as the processes executed by the server 10. Further, the system 100 may be configured so that apart or all of the storage unit included in the server 10 is included in any of the plurality of user terminals 20, 201 to 20n. Namely, the system 100 may be configured so that a part or all of the functions of any one of the user terminal 20 and the server 10 according to the system 100 is included in the other.

Further, the system 100 may be configured so that the program causes a single apparatus to perform a part or all of the functions that have been explained as the example of each of the embodiments described above without including a communication network.

(Appendix)

The explanation of the embodiments described above has been described so that the following inventions can be at least performed by a person having a normal skill in the art to which the present invention belongs.

(1)

A non-transitory computer-readable medium including a program for causing a computer to perform functions, the computer being connected to an image capturing apparatus, the functions comprising:

- a specifying function configured to specify a virtual space corresponding to a captured image, the captured image being taken by the image capturing apparatus;
- a generating function configured to generate a virtual space image, the virtual space image being obtained by photographing the virtual space including at least one virtual object by means of a virtual camera corresponding to the image capturing apparatus;
- an outputting function configured to output a synthetic image to a display device, the synthetic image being obtained by synthesizing the captured image and the virtual space image, the display device including a touch panel;
- a determining function configured to determine a content of a user operation against the touch panel;
- an updating function configured to update, in a case where it is determined that the user operation is a first operation, a position or a posture of each of the virtual camera and the virtual object in a state where a relationship between the virtual camera and the virtual object is fixed in accordance with movement or a change in a posture of the image capturing apparatus while the first operation is continuing, the first operation being an operation in which a touch position against the touch panel does not move after the touch panel is touched; and
- a rotating function configured to rotate the virtual object in a predetermined direction in a case where it is determined that the user operation is a second operation, the second operation being an operation in which the touch position is slid on the touch panel, the predetermined direction being defined by the second operation.

(2)

The non-transitory computer-readable medium according to (1),
wherein the updating function includes a function configured to update the position or the posture of the virtual object in the virtual space, the virtual object being displayed at the touch position of the first operation.

(3)

The non-transitory computer-readable medium according to (1) or (2),
wherein the rotating function includes a function configured to rotate the virtual object in a state where the position of the virtual object in the virtual space is fixed.

(4)

The non-transitory computer-readable medium according to any one of (1) to (3),
wherein the updating function includes a function configured to update the posture of the virtual object so as to rotate the virtual object around a photographing direction of the virtual camera in a case where it is determined that the user operation is the first operation and a posture of the computer is rotated by using an imaging direction of the image capturing apparatus as an axis, and
wherein the rotating function includes a function configured to rotate the virtual object around a direction orthogonal to the photographing direction in a case where it is determined that the user operation is the second operation in which the touch position is slid on the touch panel.

(5)

The non-transitory computer-readable medium according to any one of (1) to (4),
wherein the updating function includes a function configured to change from the state where relationship between the virtual camera and the virtual object is fixed to a state where the relationship is not fixed and update the state in a case where a predetermined condition in the virtual space is satisfied while the first operation is continuing.

(6)

The non-transitory computer-readable medium according to any one of (1) to (5),
wherein the updating function includes a function configured to update the position or the posture of only the virtual camera in a case where it is determined that the user operation is an operation to change a posture of the computer without touching the touch panel.

(7)

A non-transitory computer-readable medium including a program for causing a server to perform at least one function of the functions that the program described in any one of (1) to (6) causes the computer to perform, the server being capable of communicating with the computer.

(8)

A computer into which the program described in any one of (1) to (6) is installed.

(9)

An image processing system for controlling progress of information processing in response to a user operation, the image processing system comprising a communication network, a server, and a user terminal to which an image capturing apparatus is connected, the image processing system further comprising:

a specifying unit configured to specify a virtual space corresponding to a captured image, the captured image being taken by the image capturing apparatus;

a generating unit configured to generate a virtual space image, the virtual space image being obtained by photographing the virtual space including at least one virtual object by means of a virtual camera corresponding to the image capturing apparatus;

an outputting unit configured to output a synthetic image to a display device, the synthetic image being obtained by synthesizing the captured image and the virtual space image, the display device including a touch panel;

a determining unit configured to determine a content of a user operation against the touch panel;

an updating unit configured to update, in a case where it is determined that the user operation is a first operation, a position or a posture of each of the virtual camera and the virtual object in a state where a relationship between the virtual camera and the virtual object is fixed in accordance with movement or a change in a posture of the image capturing apparatus while the first operation is continuing, the first operation being an operation in which a touch position against the touch panel does not move after the touch panel is touched; and a rotating unit configured to rotate the virtual object in a predetermined direction in a case where it is determined that the user operation is a second operation, the second operation being an operation in which the touch position is slid on the touch panel, the predetermined direction being defined by the second operation.

(10)

The image processing system according to (9), wherein the server includes the specifying unit, the generating unit, the determining unit, the updating unit, and the rotating unit, and wherein the user terminal includes the outputting unit.

(11)

A non-transitory computer-readable medium including a program for causing a user terminal to perform:

a function configured to receive, from a server, information regarding functions included in the server; and a function configured to execute an input or an output corresponding to each of the functions, wherein the server comprises the functions including:

a specifying function configured to specify a virtual space corresponding to a captured image, the captured image being taken by an image capturing apparatus connected to the user terminal;

a generating function configured to generate a virtual space image, the virtual space image being obtained by photographing the virtual space including at least one virtual object by means of a virtual camera corresponding to the image capturing apparatus;

an outputting function configured to output a synthetic image to a display device, the synthetic image being obtained by synthesizing the captured image and the virtual space image, the display device including a touch panel;

a determining function configured to determine a content of a user operation against the touch panel;

an updating function configured to update, in a case where it is determined that the user operation is a first operation, a position or a posture of each of the virtual camera and the virtual object in a state where a relationship between the virtual camera and the virtual object is fixed in accordance with movement or a change in a posture of the image capturing apparatus while the first operation is continuing, the first operation being an operation in which a touch position against the touch panel does not move after the touch panel is touched; and a rotating function configured to rotate the virtual object in a predetermined direction in a case where it is determined that the user operation is a second operation, the second operation being an operation in which the touch position is slid on the touch panel, the predetermined direction being defined by the second operation.

(12)

A non-transitory computer-readable medium including a program for causing a server to perform functions, the server being capable of communicating with a user terminal, the user terminal being connected to an image capturing apparatus, the functions comprising:

a specifying function configured to specify a virtual space corresponding to a captured image, the captured image being taken by the image capturing apparatus;

a generating function configured to generate a virtual space image, the virtual space image being obtained by photographing the virtual space including at least one virtual object by means of a virtual camera corresponding to the image capturing apparatus;

an outputting function configured to output a synthetic image to a display device, the synthetic image being obtained by synthesizing the captured image and the virtual space image, the display device including a touch panel;

a determining function configured to determine a content of a user operation against the touch panel;

an updating function configured to update, in a case where it is determined that the user operation is a first operation, a position or a posture of each of the virtual camera and the virtual object in a state where a relationship between the virtual camera and the virtual object is fixed in accordance with movement or a change in a posture of the image capturing apparatus while the first operation is continuing, the first operation being an operation in which a touch position against the touch panel does not move after the touch panel is touched; and a rotating function configured to rotate the virtual object in a predetermined direction in a case where it is determined that the user operation is a second operation, the second operation being an operation in which the touch position is slid on the touch panel, the predetermined direction being defined by the second operation.

(13)

A non-transitory computer-readable medium including a program for causing a user terminal to perform at least one function of the functions that the program described in (12) causes the server to perform, the user terminal being capable of communicating with the server.

(14)

A server into which the program described in (11) or (12) is installed.

(15)

An image processing method of controlling progress of information processing in response to a user operation, the image processing method comprising:

a specifying process of specifying a virtual space corresponding to a captured image, the captured image being taken by an image capturing apparatus connected to a computer;
a generating process of generating a virtual space image, the virtual space image being obtained by photographing the virtual space including at least one virtual object by means of a virtual camera corresponding to the image capturing apparatus;
an outputting process of outputting a synthetic image to a display device, the synthetic image being obtained by synthesizing the captured image and the virtual space image, the display device including a touch panel;
a determining process of determining a content of a user operation against the touch panel;
an updating process of updating, in a case where it is determined that the user operation is a first operation, a position or a posture of each of the virtual camera and the virtual object in a state where a relationship between the virtual camera and the virtual object is fixed in accordance with movement or a change in a posture of the image capturing apparatus while the first operation is continuing, the first operation being an operation in which a touch position against the touch panel does not move after the touch panel is touched; and
a rotating process of rotating the virtual object in a predetermined direction in a case where it is determined that the user operation is a second operation, the second operation being an operation in which the touch position is slid on the touch panel, the predetermined direction being defined by the second operation.

(16)
An image processing method of controlling progress of information processing in response to a user operation by an image processing system, the image processing system comprising a communication network, a server, and a user terminal, the image processing method comprising:
a specifying process of specifying a virtual space corresponding to a captured image, the captured image being taken by an image capturing apparatus connected to the user terminal;
a generating process of generating a virtual space image, the virtual space image being obtained by photographing the virtual space including at least one virtual object by means of a virtual camera corresponding to the image capturing apparatus;
an outputting process of outputting a synthetic image to a display device, the synthetic image being obtained by synthesizing the captured image and the virtual space image, the display device including a touch panel;
a determining process of determining a content of a user operation against the touch panel;
an updating process of updating, in a case where it is determined that the user operation is a first operation, a position or a posture of each of the virtual camera and the virtual object in a state where a relationship between the virtual camera and the virtual object is fixed in accordance with movement or a change in a posture of the image capturing apparatus while the first operation is continuing, the first operation being an operation in which a touch position against the touch panel does not move after the touch panel is touched; and
a rotating process of rotating the virtual object in a predetermined direction in a case where it is determined that the user operation is a second operation, the second operation being an operation in which the touch position is slid on the touch panel, the predetermined direction being defined by the second operation.

INDUSTRIAL APPLICABILITY

According to one of the embodiments of the present invention, it is useful to improve operability of an AR object.

What is claimed is:

1. A non-transitory computer-readable medium including a program for causing a computer to perform functions, the computer being connected to an image capturing apparatus, the functions comprising:
specifying a virtual space corresponding to a captured image, the captured image being taken by the image capturing apparatus;
generating a virtual space image, the virtual space image being obtained by photographing the virtual space including at least one virtual object by means of a virtual camera corresponding to the image capturing apparatus;
outputting a synthetic image to a display device, the synthetic image being obtained by synthesizing the captured image and the virtual space image, the display device including a touch panel;
determining a content of a user operation against the touch panel;
updating, in a case where it is determined that the user operation is a first operation, a position or a posture of each of the virtual camera and the virtual object in a state where a relationship between the virtual camera and the virtual object is fixed in accordance with movement or a change in a posture of the image capturing apparatus while the first operation is continuing, the first operation being an operation in which a touch position against the touch panel does not move after the touch panel is touched;
determining that the first operation is continuing until a predetermined end condition is satisfied regardless of whether the touch position is lost after it is determined that the user operation is the first operation; and
rotating the virtual object in a predetermined direction in a case where it is determined that the user operation is a second operation, the second operation being an operation in which the touch position is slid on the touch panel, the predetermined direction being defined by the second operation.

2. The non-transitory computer-readable medium according to claim 1,
wherein the updating includes updating the position or the posture of the virtual object in the virtual space by displaying the virtual object at the touch position of the first operation.

3. The non-transitory computer-readable medium according to claim 1,
wherein the rotating includes rotating the virtual object in a state where the position of the virtual object in the virtual space is fixed.

4. The non-transitory computer-readable medium according to claim 1,
wherein the updating includes updating the posture of the virtual object so as to rotate the virtual object around a photographing direction of the virtual camera in a case where it is determined that the user operation is the first operation and a posture of the computer is rotated by using an imaging direction of the image capturing apparatus as an axis, and wherein the rotating includes rotating the virtual object around a direction orthogonal to the photographing direction in a case where it is determined that the user operation is the second operation in which the touch position is slid on the touch panel.

5. The non-transitory computer-readable medium according to claim 1,
wherein the updating includes:
changing from the state where relationship between the virtual camera and the virtual object is fixed to a state where the relationship is not fixed; and
updating the state in a case where a predetermined condition in the virtual space is satisfied while the first operation is continuing.

6. The non-transitory computer-readable medium according to claim 1,
wherein the updating includes updating the position or the posture of the virtual camera in a case where it is determined that the user operation is an operation to change a posture of the computer without touching the touch panel.

7. An image processing method of controlling progress of information processing in response to a user operation, the image processing method comprising:
specifying a virtual space corresponding to a captured image, the captured image being taken by an image capturing apparatus connected to a computer;
generating a virtual space image, the virtual space image being obtained by photographing the virtual space including at least one virtual object by means of a virtual camera corresponding to the image capturing apparatus;
outputting a synthetic image to a display device, the synthetic image being obtained by, synthesizing the captured image and the virtual space image, the display device including a touch panel;
determining a content of a user operation against the touch panel;
updating, in a case where it is determined that the user operation is a first operation, a position or a posture of each of the virtual camera and the virtual object in a state where a relationship between the virtual camera and the virtual object is fixed in accordance with movement or a change in a posture of the image capturing apparatus while the first operation is continuing, the first operation being an operation in which a touch position against the touch panel does not move after the touch panel is touched;
determining that the first operation is continuing until a predetermined end condition is satisfied regardless of whether the touch position is lost after it is determined that the user operation is the first operation; and
rotating the virtual object in a predetermined direction in a case where it is determined that the user operation is a second operation, the second operation being an operation in which the touch position is slid on the touch panel, the predetermined direction being defined by the second operation.

8. An image processing system for controlling progress of information processing in response to a user operation, the image processing system comprising a communication network, a server, and a user terminal to which an image capturing apparatus is connected, the image processing system further comprising:
a specifying unit configured to specify a virtual space corresponding to a captured image, the captured image being taken by the image capturing apparatus;
a generating unit configured to generate a virtual space image, the virtual space image being obtained by photographing the virtual space including at least one virtual object by means of a virtual camera corresponding to the image capturing apparatus;
an outputting unit configured to synthesize the captured image and the virtual space image into a synthetic image and further configured to output the synthetic image to a display device including a touch panel;
a determining unit configured to determine a content of a user operation against the touch panel;
an updating unit configured to update, in a case where it is determined that the user operation is a first operation, a position or a posture of each of the virtual camera and the virtual object in a state where a relationship between the virtual camera and the virtual object is fixed in accordance with movement or a change in a posture of the image capturing apparatus while the first operation is continuing, the first operation being an operation in which a touch position against the touch panel does not move after the touch panel is touched, and further configured to determine that the first operation is continuing until a predetermined end condition is satisfied regardless of whether the touch position is lost after it is determined that the user operation is the first operation; and
a rotating unit configured to rotate the virtual object in a predetermined direction in a case where it is determined that the user operation is a second operation, the second operation being an operation in which the touch position is slid on the touch panel, the predetermined direction being defined by the second operation.

9. The image processing system of claim 8, wherein the updating unit is configured to cause the virtual camera and the virtual object to execute the same behavior in the virtual space.

10. The image processing system of claim 8, wherein the updating unit is configured to maintain a relationship of at least one of the position or the posture between the virtual camera and the virtual object.

* * * * *